United States Patent

Agostini et al.

[11] Patent Number: 5,095,819
[45] Date of Patent: Mar. 17, 1992

[54] METHOD FOR THE PRINTED REPRODUCTION OF CONTINUOUS-TONE POLYCHROME ORIGINALS

[75] Inventors: Dario Agostini, Cantalupa; Alberto Fino, Turin; Franco Mascarello, Turin; Benito Sciarretta, Turin, all of Italy

[73] Assignee: Industria Libraria Tipografica Editrice S.p.A., Moncalieri, Italy

[21] Appl. No.: 754,258

[22] Filed: Aug. 27, 1991

Related U.S. Application Data

[63] Continuation of Ser. No. 569,485, Aug. 15, 1990, abandoned, which is a continuation of Ser. No. 361,696, Jun. 1, 1989, abandoned, which is a continuation of Ser. No. 862,727, May 13, 1986, abandoned.

[30] Foreign Application Priority Data

Aug. 31, 1985 [IT] Italy ............... 67733 A/85
Jan. 24, 1986 [IT] Italy ............... 67060 A/86

[51] Int. Cl.⁵ ............................. B41M 3/00
[52] U.S. Cl. .......................... 101/211; 101/401.1
[58] Field of Search ............. 101/211, 395, 401.1, 101/483, 463.1; 430/301, 367, 396, 44

[56] References Cited

U.S. PATENT DOCUMENTS 4,554,241 11/1985 Edwards .................. 101/211 X

FOREIGN PATENT DOCUMENTS 0148549 2/1987 European Pat. Off.
406023 2/1934 United Kingdom.

OTHER PUBLICATIONS

"Multicolor Effects on Two-Color Presses", *DuPont Magazine*, Sep.–Oct. 1968, vol. 62, No. 5, E. I. Du Pont de Nemours, Wilmington, Del.
"The Ilford Manual of Process Work", 5th Ed., 1951, pp. 415–416, Ilford Ltd., 1951.
"Dictionary of Engineering by the Printers' Union", Turin Publihers, Turin 1970 with English translation thereof.
"Inks for Offset Three-or-Four-Colour Printing", British Standards Inst., British Standard 4666: 1971.
"Complementary Color Reduction CCR Theoretical Guide", Order No. 3000-S2e-8404, Dr. Ing. Rudolf Hell GmbH, Keil 14, pp. 1-20.

*Primary Examiner*—J. Reed Fisher
*Attorney, Agent, or Firm*—Sughrue, Mion, Zinn, Macpeak & Seas

[57] ABSTRACT

Continuous-tone polychrome subjects (O) are reproduced by ink printing on a substrate. The reproduction is achieved by the synthesis of three chromatic components, one of which corresponds to the color of the substrate and the other two of which correspond to the colored inks used for the printing. In one variant of the method, one of the colored inks is replaced by a black ink, printed with a plate made from the achromatic component of the subject.

4 Claims, 4 Drawing Sheets

METHOD FOR THE PRINTED REPRODUCTION OF CONTINUOUS-TONE POLYCHROME ORIGINALS

DESCRIPTION

Field of the Invention

The present invention relates to the reproduction of continuous-tone polychrome originals by printing.

By the term "continuous-tone polychrome originals" is meant, in general, subjects such as coloured photographs on opaque or transparent substrates, photocolours and colour duplicates, pictures and sketches carried out by various techniques, labels, covers of publications, and printed material in general having tonal values in between black and white.

The printed reproduction of the colours of such subjects is normally achieved by the principles of subtractive synthesis, that is to say, by analysis of the content of three primary colours (yellow, magenta, cyan) of the original subject and the superposition of inks with colours corresponding to the primary colours of the aforementioned subtractive synthesis during the printing step.

The selection of the colours, that is, the identification of each primary chromatic component in the subject to be reproduced, is achieved both by conventional photographic techniques and the use of coloured filters and—according to a solution ever more widely used—by the use of electronic apparatus known as "scanners" or selectors.

The selection of the colours enables a black and white film to be obtained for each chromatic component, on which there are reproduced dots whose distribution and dimensions are indicative of the intensity with which the corresponding chromatic component is present in a predetermined zone or area of the original.

More particularly, for each zone or area of the original, or for the original in its entirety, it is possible to identify a dominant chromatic component, that is, a chromatic component which is present to a greater extent than the others in terms of intensity, contrast, and accentuation. Naturally, it is also possible to identify more than one dominant chromatic component.

For example, in an original of a yellow or slightly amber colour, the yellow chromatic component will constitute a fully dominant component. In an original which has a generally green colour under observation, the yellow component and the cyan component, will be present as dominant components, etc.

According to a common situation in the field of colorimetry and the printing arts, the concepts expressed above are difficult to tie down to precise quantitative criteria of discrimination. They are immediately appreciated by the expert in the art, however, who is able to recognise with assurance, on the basis of the result of the selection of colours of an original, which are the dominant components thereof.

The general criteria used for the reproduction of polychrome subjects by printing, however, are widely known and do not need to be explained further to allow complete understanding of the invention.

For this purpose it will suffice to note that, in the polychrome printing processes of, the prior art, use is generally made of an opaque printing substrate, normally paper, of a white or neutral colour, on which four inks are printed successively. One of these inks is a black ink whose distribution corresponds essentially to the chiaroscuro content or the light and shade (luminance) content of the image, while the other three inks each correspond to one of the basic chromatic components identified during the colour selection.

Printing plates are used for the printing of each ink and take on typological characteristics which are differentiated according to the method (typographic by the relief printing process, offset by the planographic process, rotogravure by the intaglio printing process, etc.) used for the printing.

OBJECT OF THE INVENTION

As seen from the above, in order to reproduce a continuous-tone polychrome subject by printing, it is normally necessary to effect four successive printing actions with different inks and plates.

This conventional solution, although being entirely satisfactory from a qualitative point of view, may be excessively expensive for some publications with very wide circulations, for which it is intended to keep the cost of each copy to a minimum.

A classic example of a publication of this type is the telephone directory.

For this reason, it has been preferred up till now to avoid the reproduction of continuous-tone subjects for such publications, the reproduction thus being limited to line subjects.

The object of the present invention, therefore, is to provide a method which allows continuous tone polychrome subjects to be reproduced by ink printing with an efficiency and rapidity such as to give a considerable reduction in costs without compromising the quality of the reproduction significantly.

SUMMARY OF THE INVENTION

According to the present invention, this object is achieved by virtue of a method for the reproduction of continuous-tone polychrome originals having three chromatic components by ink printing on a substrate characterised in that use is made of a substrate having a colour corresponding to one of the three chromatic components and only two inks, at least one of which has a colour corresponding to one of the other two of the three chromatic components.

The method of the invention lends itself ideally to the reproduction of continuous-tone polychrome subjects on coloured printing substrates such as, in a typical use, the "Yellow Pages" of telephone directories. In this case, in fact, the printing substrate has a yellow colour corresponding to one of the chromatic components used for the selection of the colours according to the criteria of subtractive synthesis.

Naturally, it is possible to envisage the use of printing substrates with different colours, for example printing substrates of green, blue, etc.

In each case, the method of the invention enables two of the printing steps required by the conventional four-colour printing methods to be eliminated.

DETAILED DESCRIPTION OF THE INVENTION

The invention will now be described, by way of non-limiting example, with reference to the appended drawings, in which.

Figure 1:
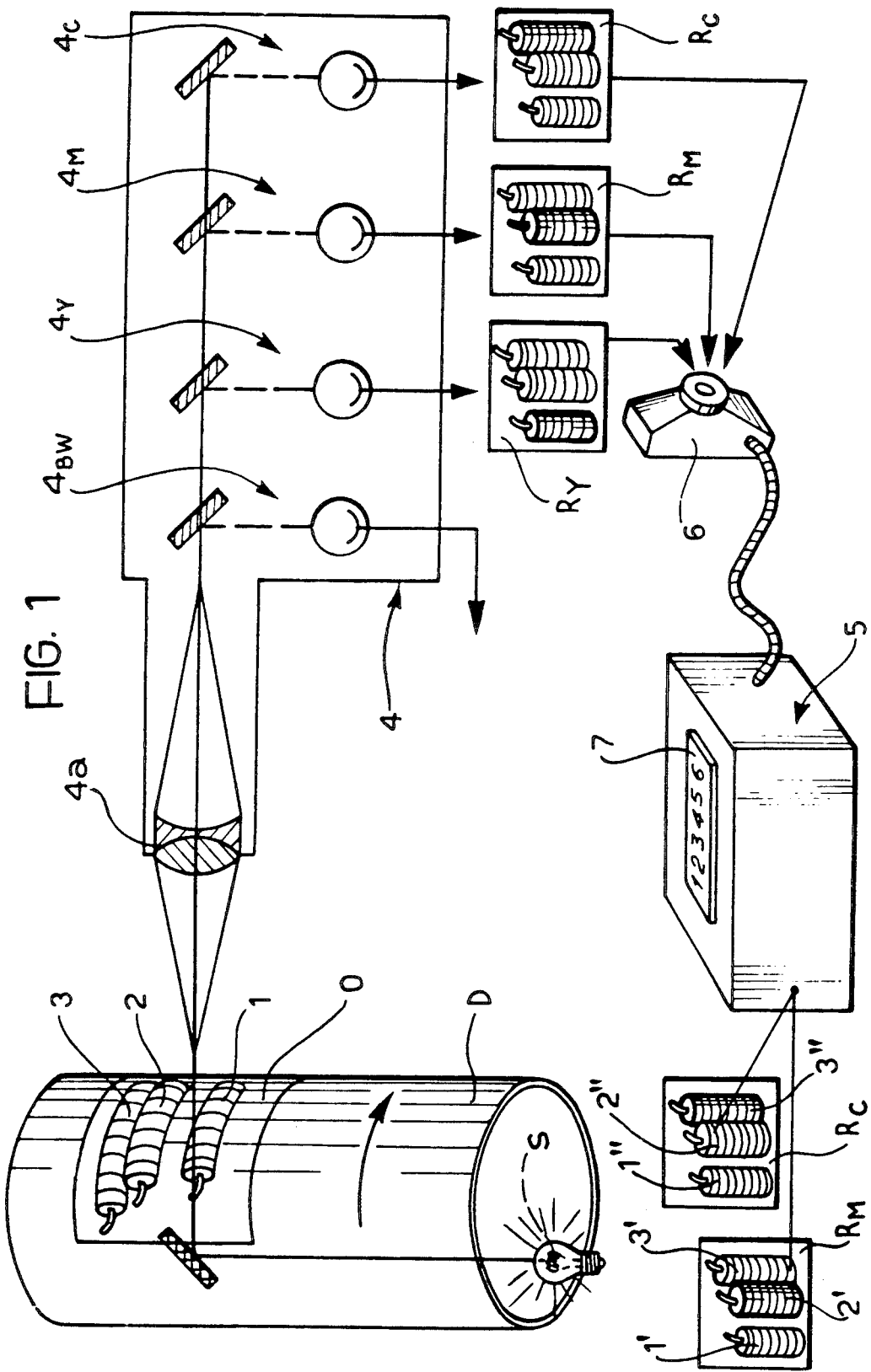
FIG. 1 illustrates schematically a step in the method of the invention.
Figure 5:
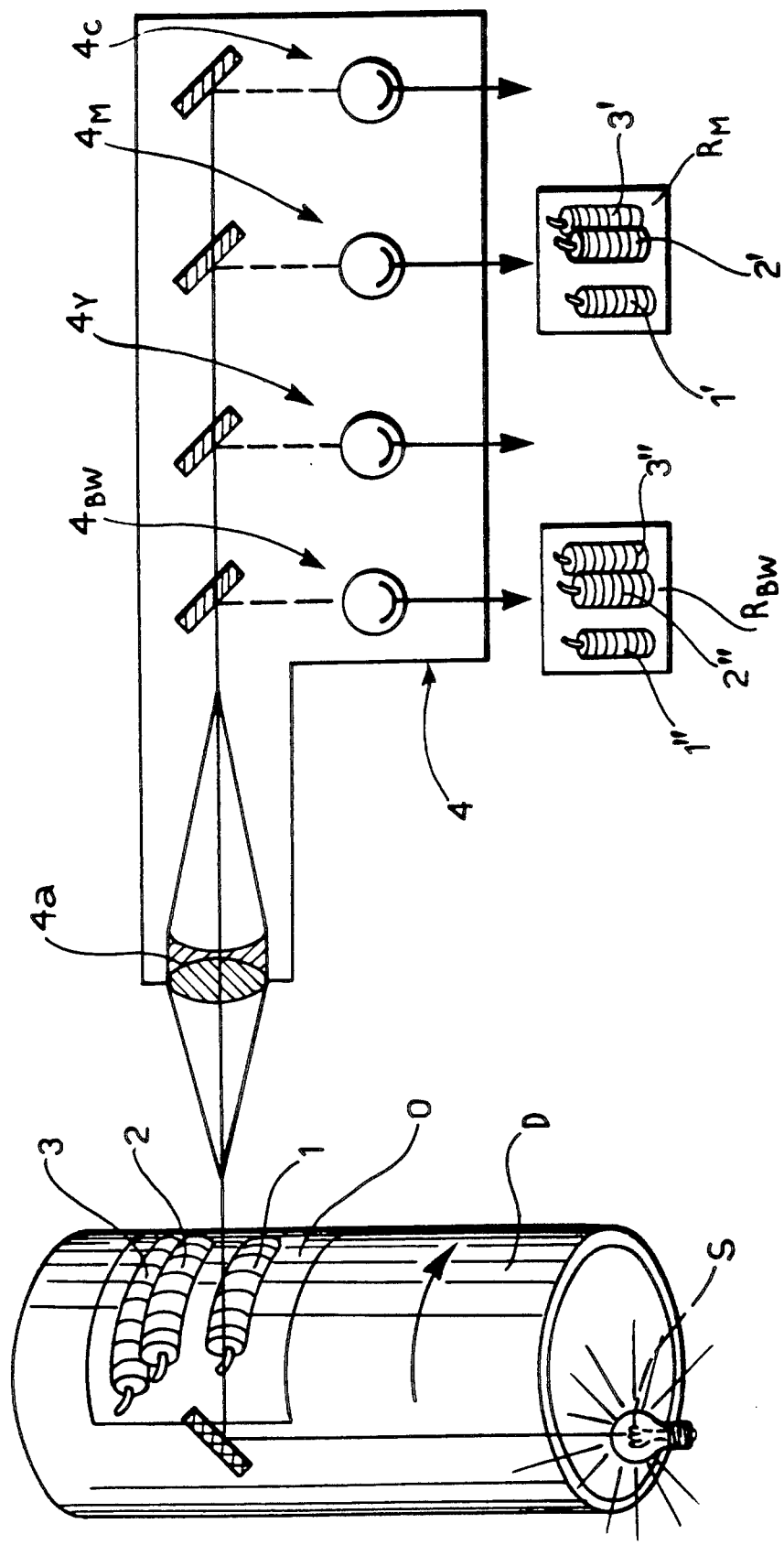

In FIGS. 1 and 5, a continuous-tone polychrome subject which is to be reproduced by printing on a substrate is generally indicated O.

As an example of a polychrome subject, reference will be made to a colour photograph on a transparent substrate.

Naturally, this is only one of the many possible choices, since the subject reproducible by the method of the invention may also be constituted by a colour photograph on an opaque substrate and colour duplicates, pictures and sketches carried out by various methods, printed articles, labels, etc.

It being wished to compensate in the description for the unavailability of coloured drawings, one will suppose that the original O to be reproduced has three objects constituted by three candles 1, 2, 3 of an amber colour, a red colour and a green colour respectively, on a generally neutral background.

In the first step of the method of the invention, the original O is subjected to a colour selection operation carried out by means of a selector or "scanner" 4. The operating criteria of this device are well known.

Briefly, it should be noted that, during the selection operation, the original O is scanned optically in a line by line and point by point scanning scheme. In the embodiment illustrated, the original O, constituted by a transparent colour photograph, is located on a transparent substrate (preferably constituted by a rotary drum D) so as to be passed through by light from a source S. The selector or scanner 4 is constituted essentially by an objective 4a which collects the light which has passed through the original O, and by four optical processing chains or selector units, indicated $4_{BH}$, $4_Y$, $4_M$ and $4_C$ respectively, each of which comprises a filter and an electronic photomultiplier disposed downstream of the filter in the path of propagation of the light. Whatever the specific criteria of realisation (which are widely known), the function of the device 4 is to analyse the original O and to extract the information relative to the chiaroscura (luminance) content of the original O and the intensity distribution of the three basic chromatic components, yellow, magenta and cyan in the original.

In particular, each of the selector units $4_Y$, $4_M$ and, $4_C$ detects the information relative to the intensity of the corresponding chromatic component. More precisely, the unit $4_Y$ detects the information relative to the yellow content, the unit $4_M$ the information relative to the magenta, content, and the unit $4_C$ the information relative to the cyan content.

This information on the basic chromatic components is emitted by the device 4 in the form of dotted (halftone) films in which the distribution, dimensions and densities of the dots of each region or area of the film is indicative of the intensity of the corresponding component in the homologous area or zone of the original O.

In general, and according to widely known criteria, a high dot density in a predetermined zone of the film indicates a high intensity of the corresponding chromatic component of this zone of the original.

The three dotted films corresponding to the three chromatic components, yellow, magenta and cyan, generated by the selector device 4 are indicated $R_Y$, $R_M$ and $R_C$, respectively, in FIG. 1.

If these dotted films are compared with each other, it is possible to select the two dotted films corresponding to the first and second dominant chromatic components, that is to say the two chromatic components which have the greatest overall intensity, contrast and accentuation in the original O.

This selection can be easily carried out for each original O by an operator.

Alternatively, however, the selecting operation may be carried out instrumentally by a measuring device 5 which compares the three films $R_Y$, $R_M$ and $R_C$, enabling the choice of the two in which the density, the dimensions of the dots, the contrast, and the accentuation are highest.

The device 5, which is considered as known in itself, may be constituted, for example, by a photo-optic system 6 which scans precise, well-determined zones or areas of the three films $R_Y$, $R_M$ and $R_C$ in sequence, and by a digitalizing photomultiplier 7 which converts the light signals generated by the photo-optic system 6 into digital form. From the numerical data emitted by the processor 7, the operator compares the density, the dimensions of the dots, the contrast, etc., indicating which of the three films correspond to the two dominant chromatic components.

In practice, once a group of substantially homogeneous originals have been identified, the choice of the two dominant components need not be repeated for all the originals, since the two dominant chromatic components are already identified with sufficient certainty for the whole group.

For example, according to tests made by the applicants in most continuous-tone polychrome subjects to be reproduced by printing on a yellow substrate, the dominant components are those corresponding to magenta and cyan.

Figure 2:
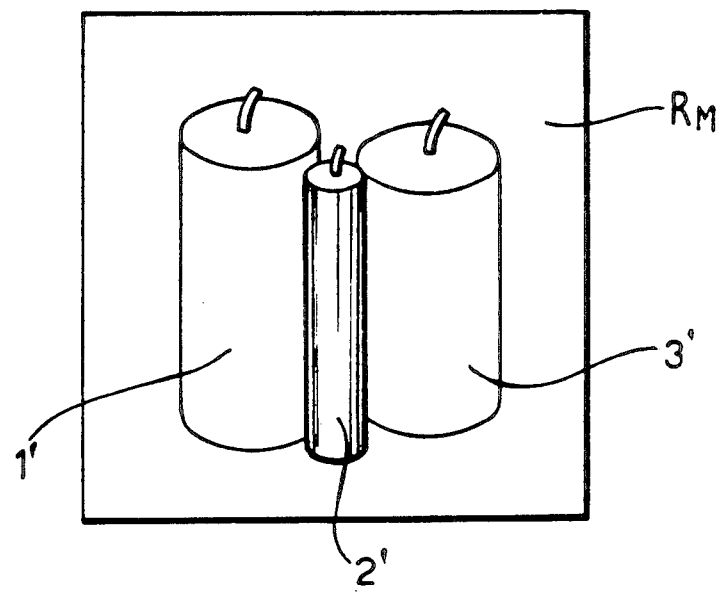
FIGS. 2 to 4 illustrate further steps in the method.
Figure 3:
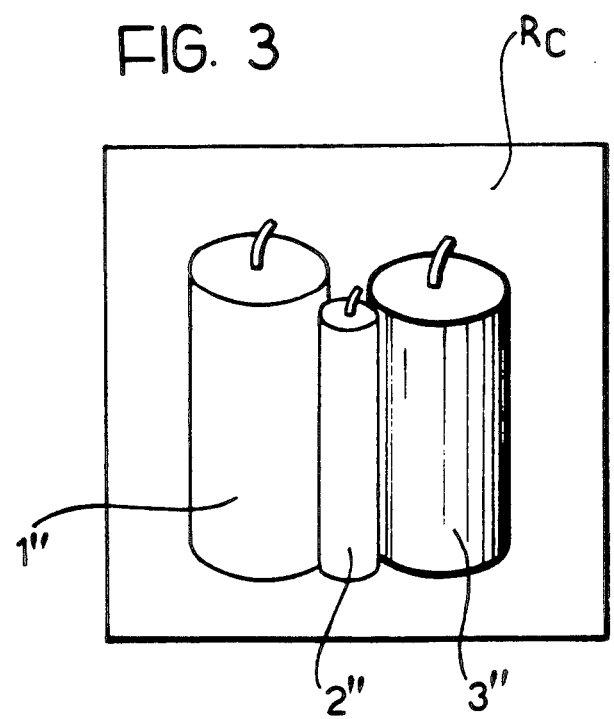

The two corresponding films $R_M$ and $R_C$ are illustrated schematically in FIGS. 2 and 3.

The film $R_M$ corresponding to the magenta component will have a very noticeable image 2' of the candle 2 with a generally red colour. On the other hand, the images corresponding to the other two candles, indicated 1' and 3', will be very soft.

In the film $R_C$, however, there is a very prominent image 3" of the green candle 3 and two very much softer images 1" and 2" of the orange candle 1 and the red candle 2.

The two films $R_M$ and $R_C$ corresponding to the two dominant chromatic components are used to form the so-called printing plates (by known techniques which differ in dependence on the printing process, adopted).

The print is formed on a substrate preferably constituted by a sheet of paper 9 corresponding to the third chromatic component of the original. Typically, one is considering a sheet 9 of yellow paper of the type used for printing the "Yellow Pages" of telephone directories.

In other words, in the method of the invention, it is the printing substrate which provides the third chromatic component which enables the reproduction of the polychrome subject by synthesis.

As already described above, it is possible to choose printing substrates with colours other than yellow, for example green or blue sheets.

The printing on the substrate 9 is carried out with the use, in combination with the printing plate obtained from the film $R_M$, of an ink having colour corresponding essentially to the magenta chromatic component to which the film relates. The printing plate obtained from the film $R_C$, is used with a second ink having a colour corresponding essentially to the cyan chromatic component.

Figure 4:
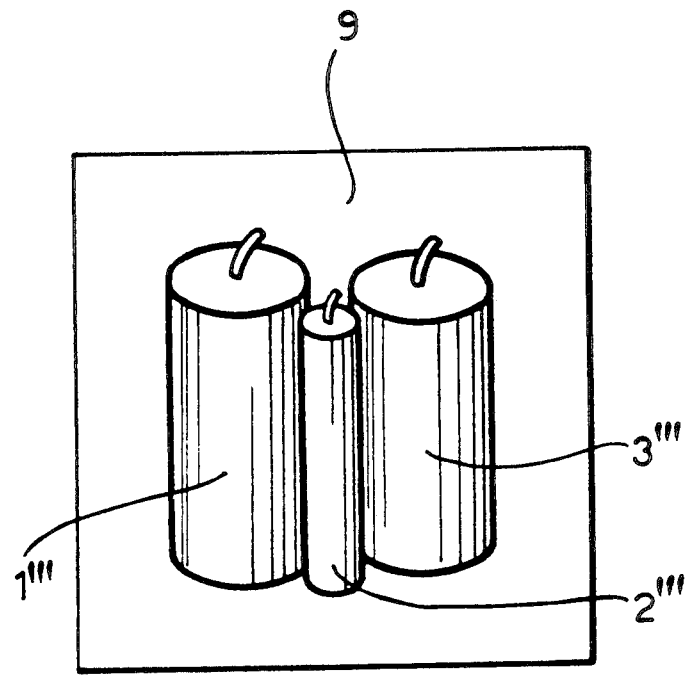

The superposition of the colours of the inks and the colour of the printing substrate causes the formation of three polychrome images $1'''$, $2'''$ and $3'''$ on the substrate 9 itself, corresponding to the three candles illustrated in the original O (FIG. 4).

The Applicants have been able to observe, however, that the best results—particularly with regard to the chromatic quality of the reproduction—is obtained with the use of printing inks whose colours correspond substantially but are chromatically distinct from (that is not perfectly coincident with) the chromatic component used to obtain the respective printing plate.

More precisely, it has been possible to see that the best choice for printing with the plate obtained from the film $R_M$ (magenta component) is an ink having a colour substantially corresponding to the red colour identified in the 1931 C.I.E. system by the tristimulus values.

$X = 32.7571$ $Y = 21.7000$ and $Z = 9.7432$ or from the trichromatic coordinates $x = 0.5102$ and $y = 0.3380$.

The 1931 C.I.E. system is universally known and adopted by all colorimetry experts. For a brief description of it, reference may be made to page 307 of Volume 3 of the Dictionary of Engineering by the Printers' Union— Turin publishers— Turin 1970, as well as to the UNI Standards 7327- 74- which relate to the criteria for determining the coordinates indicated above.

For printing with the block or plate obtained from the film $R_C$ (cyan component), it has been shown to be best to choose an ink with a colour corresponding substantially to the colour black identified in the 1931 C.I.E. system by the tristimulus values $X = 7.6816$, $Y = 7.7000$ and $Z = 8.5032$.

Finally, with regard to the choice of the colour of the substrate 9, the best choice is that of a paper with a colour corresponding substantially to the yellow identified in the 1931 C.I.E. system by the tristimulus values $X = 59.0086$, $Y = 62.5000$ and $Z = 35.4052$, or by the trichromatic coordinates $x = 0.3760$ and $y = 0.3983$.

The variant of the invention illustrated in FIG. 5 makes use of the possibility, provided for in most scanners like the device 4, of extracting the socalled achromatic component or chiaroscuro content (luminance) of the original O through the unit $4_{BW}$; the information relating to the achromatic component.

In particular, the essential characteristic of the method according to the variant of FIG. 5 arises from the fact that the chromatic selection of the original O is carried out so as to obtain two films corresponding respectively to the achromatic component and just one of the chromatic components. In the embodiment illustrated, which refers to the use of a substrate having a generally yellow colour as the printing substrate, the film $R_M$ corresponding to the magenta chromatic component is obtained in addition to the film $R_{BW}$ corresponding to the achromatic component.

Figure 6:
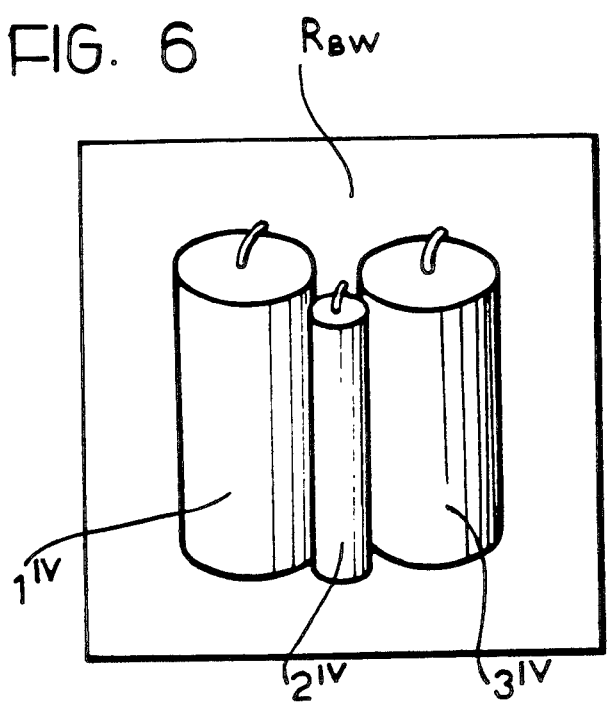
FIGS. 5 and 6 illustrate a possible variant of the carrying out of the method of the invention.

The two films corresponding to the magenta component $R_M$ and to the achromatic component $R_{BW}$ are illustrated schematically in FIG. 2 (already considered above) and in FIG. 6.

As shown, in the film $R_M$ corresponding to the magenta component, the image $2'$ of the candle 2 with a generally red colour is more distinct than the images $1'$ and $3'$ of the other two candles 1 and 3.

In the film $R_{BW}$ corresponding to the achromatic component, however, images $1^{II}$, $2^{II}$ and $3^{II}$ of all the three candles 1, 2, 3 are present, which reproduce essentially the grey content or black and white content of the original.

With regard to the removal of the achromatic component, it may be noted that this is already in use today in four-colour printing carried out by the technique known as "under-colour removal" (UCR) or "achromatic syntesis" in English terminology, or by the term "Unbunt-Aufbau" in the terminology used in German-speaking countries.

In the prior art, however, the achromatic component is removed essentially in order to allow printing in black to replace the particular partial contribution of grey given by each chromatic component.

In ordinary four-colour printing, in fact, as a result of tinting errors in the inks used for the printing of the chromatic components and as a result of partial reflections, a very considerable amount of the coloured inks (yellow, red and blue) used does not contribute effectively to enriching the chromatic content of the reproduction but, on the contrary, contributes exclusively to the formation, together with similar fractions of other coloured inks, of a grey background component of the image.

The purpose of removing the achromatic component is that of obtaining films for printing with coloured inks in which the information relating to the fraction of the chromatic component which contributes exclusively to the grey content of the image is removed. The consequent weakening of the grey content, and hence of the accentuation of the image reproduced, is compensated for by the increase in the intensity with which the black component of the four colours is printed.

In other words, with this technique—as used conventionally—the formation of a grey component by superposition of (generally expensive) coloured inks is avoided, it being possible to introduce this component into the reproduction, by an increase in the intensity of the printing effected with the cheaper black ink.

Apart from the cost advantages thus achieved, however, the qualitative result of the reproduction obtained with the removal of the achromatic component is, for the most part, comparable to that obtainable with four-colour printing without removal of this component.

In a wholly unexpected and surprising manner, however, the Applicants have been able to observe that the removal of the achromatic component, carried out in a process for the reproduction of continuous-tone polychrome subjects by printing on a coloured substrate with only two inks, results in a considerable qualitative improvement in the image reproduced.

As seen in the embodiment referred to in the present description, in which the printing is effected on a substrate having a yellow colour, in addition to the achromatic component, the magenta chromatic component is selected as the chromatic component.

When the printing is carried out on substrates of different colours, the use of the achromatic component remaining the same, different chromatic components may be used. For example, for printing on a substrate constituted by a sheet of generally blue colour, a chromatic component other than yellow will be selected.

Whatever the chromatic component selected, the film corresponding to this component (in the case illustrated here, the film $R_M$ corresponding to the magenta component) and the film $R_{BW}$ corresponding to the achromatic component are used, in accordance with the prior art, to produce the so-called printing plates which differ in dependence on the printing processes adopted.

As in the embodiment illustrated in FIG. 1, the printing on the substrate 9 is carried out with the use, in combination with the printing plate obtained from the film $R_M$, of an ink having a colour substantially corresponding to, but chromatically distinct from, the chromatic component used to obtain the respective printing plate.

More particularly, even in the case of the variant of FIG. 5, the best choice for printing with the plate obtained from the film $R_M$ corresponding to the magenta component is an ink having the red colour identified the 1931 CIE system by the tristimulus values and the trichromatic coordinates mentioned above.

For printing with the plate obtained from the film $R_{BW}$ (achromatic component), however, it has been shown that the optimum choice for the printing ink is the black colour used in the embodiment of FIG. 1 with the printing plate obtained from the half-tone film corresponding to the cyan chromatic component.

In the case of the variant of FIG. 5 also, the superposition of the colours of the inks and the colours of the printing substrate determines the formation on the substrate 9 itself of three polychrome images 1''', 2''', and 3''' corresponding to the three candles 1, 2, 3 in the original O (FIG. 4).

The overall appearance of the reproduction obtained may be likened in most cases to that obtainable by the four-colour rotogravure printing currently used for the printing of widely distributed periodicals.

We claim:

1. A method for the reproduction of continuous-polychrome originals having three chromatic components by ink printing on a substrate, including the steps of carrying out a chromatic analysis of the original to be reproduced, extracting the magenta component and the achromatic component of the original, producing first and second printing plates corresponding to said magenta and achromatic components respectively, selecting first and second inks having a substantially red and a substantially black color respectively, and printing said first and second inks on a yellow substrate using only said first and second printing plates respectively.

2. The method according to claim 1, wherein the printing substrate has a color substantially corresponding to the yellow color, identified in the 1931 C.I.E. system by the trichromatic coordinates $X=0.3760$ and $Y=0.3983$.

3. The method according to claim 1, wherein said substantially red ink has a color substantially corresponding to the color red identified in the 1931 C.I.E. system by the trichromatic coordinates $X=0.5102$ and $Y=0.3380$.

4. A method according to claim 1, wherein said substantially black ink has a color corresponding to the color black identified in the 1931 C.I.E. system by the tristimulous values $X=7.6816$ and $Y=7.700$ and $Z=8/5032$.

* * * * *

UNITED STATES PATENT AND TRADEMARK OFFICE
CERTIFICATE OF CORRECTION

PATENT NO. : 5,095,819
DATED : March 17, 1992
INVENTOR(S) : Agostini, Et al

It is certified that error appears in the above-indentified patent and that said Letters Patent is hereby corrected as shown below:

On the title page:

Item [30], change "Aug. 31, 1985" to --August 21, 1985--.

Signed and Sealed this

Thirty-first Day of August, 1993

*Attest:*

BRUCE LEHMAN

*Attesting Officer*   *Commissioner of Patents and Trademarks*